US012254021B2

United States Patent
Haudenschild

(10) Patent No.: US 12,254,021 B2
(45) Date of Patent: *Mar. 18, 2025

(54) METHOD AND SYSTEM FOR ADAPTING PROGRAMS FOR INTEROPERABILITY AND ADAPTERS THEREFOR

(71) Applicant: CLINICOMP INTERNATIONAL, INC., San Diego, CA (US)

(72) Inventor: Chris A. Haudenschild, San Diego, CA (US)

(73) Assignee: CliniComp International, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,895

(22) Filed: Jun. 13, 2023

(65) Prior Publication Data

US 2023/0325398 A1    Oct. 12, 2023

Related U.S. Application Data

(63) Continuation of application No. 17/651,403, filed on Feb. 16, 2022, now Pat. No. 11,714,822, which is a
(Continued)

(51) Int. Cl.
*G06F 16/25* (2019.01)
*G06F 9/54* (2006.01)
(Continued)

(52) U.S. Cl.
CPC ............ *G06F 16/252* (2019.01); *G06F 9/541* (2013.01); *G06F 16/2448* (2019.01); *G06F 16/24547* (2019.01); *H04L 67/34* (2013.01)

(58) Field of Classification Search
CPC .................................. G06F 9/541; H04L 67/34
See application file for complete search history.

(56) References Cited

U.S. PATENT DOCUMENTS 5,611,076 A    3/1997 Durflinger et al.
5,692,129 A    11/1997 Sonderegger et al.
(Continued)

FOREIGN PATENT DOCUMENTS

CN    1549163 A    11/2004
CN    1856790       11/2006
(Continued)

OTHER PUBLICATIONS

Haas et al., Data integration through database federation, Dec. 31, 2002.
(Continued)

*Primary Examiner* — Henry Tsai
*Assistant Examiner* — Aurangzeb Hassan

(57) ABSTRACT

A method and system according to embodiments enable generalized program to program interoperability. The method and system employ an automatic or substantially automatic transform adapter for using a given exchange standard for two-way communication with a program. In order for the adapter to employ the exchange standard, a discovery manager may learn the program's data communications structure and/or format, and may learn data meaning information from the program. An adapter creator may derive a transform which converts the program's data communications structure and data meaning into the exchange standard. The transform may be used by the adapter to enable two-way communication with any adapter and/or program similarly employing the given exchange standard to achieve interoperability.

37 Claims, 5 Drawing Sheets

Related U.S. Application Data continuation of application No. 16/542,259, filed on Aug. 15, 2019, now Pat. No. 11,256,709.

(51) Int. Cl.
  *G06F 16/242* (2019.01)
  *G06F 16/2453* (2019.01)
  *H04L 67/00* (2022.01)

(56) References Cited

U.S. PATENT DOCUMENTS

| | | |
|---|---|---|
| 5,829,006 A | 10/1998 | Parvathaneny et al. |
| 5,857,197 A | 1/1999 | Mullins |
| 5,966,707 A | 10/1999 | Van Huben et al. |
| 5,970,490 A | 10/1999 | Morgenstern |
| 6,016,497 A | 1/2000 | Suver |
| 6,021,405 A | 2/2000 | Celis et al. |
| 6,085,030 A | 7/2000 | Whitehead et al. |
| 6,119,126 A | 9/2000 | Yee et al. |
| 6,223,227 B1 | 4/2001 | Williamson et al. |
| 6,237,041 B1 | 5/2001 | Haal et al. |
| 6,256,676 B1 | 7/2001 | Taylor et al. |
| 6,385,604 B1 | 5/2002 | Bakalash et al. |
| 6,442,541 B1 | 8/2002 | Clark et al. |
| 6,484,177 B1 | 11/2002 | Van Huben et al. |
| 6,523,130 B1 | 2/2003 | Hickman et al. |
| 6,567,814 B1 | 5/2003 | Bankier et al. |
| 6,571,232 B1 | 5/2003 | Goldberg et al. |
| 6,604,135 B1 | 8/2003 | Rogers et al. |
| 6,606,637 B1 | 8/2003 | Hill et al. |
| 6,647,420 B2 | 11/2003 | Hellbusch et al. |
| 6,704,726 B1 | 3/2004 | Amouroux |
| 6,704,747 B1 | 3/2004 | Fong |
| 6,732,094 B1 | 5/2004 | Cousins et al. |
| 6,738,975 B1 | 5/2004 | Yee et al. |
| 6,792,431 B2 | 9/2004 | Tamboli et al. |
| 6,804,723 B1 | 10/2004 | Horikiri |
| 6,816,869 B2 | 11/2004 | Kagalwala et al. |
| 6,856,992 B2 | 2/2005 | Britton et al. |
| 6,862,594 B1 | 3/2005 | Saulpaugh et al. |
| 6,880,151 B2 | 4/2005 | Abdelhadi et al. |
| 6,988,099 B2 | 1/2006 | Wiser et al. |
| 6,988,109 B2 | 1/2006 | Stanley et al. |
| 7,072,898 B2 | 7/2006 | Bussler et al. |
| 7,114,037 B2 | 9/2006 | Agarwal et al. |
| 7,117,228 B2 | 10/2006 | Tomita et al. |
| 7,130,893 B2 | 10/2006 | Chiang et al. |
| 7,139,766 B2 | 11/2006 | Thomson et al. |
| 7,143,080 B2 | 11/2006 | Tedesco |
| 7,181,438 B1 | 2/2007 | Szabo |
| 7,225,189 B1 | 5/2007 | McCormack et al. |
| 7,240,063 B2 | 7/2007 | Aoyama |
| 7,257,820 B2 | 8/2007 | Fischer et al. |
| 7,266,622 B2 | 9/2007 | Flanigan et al. |
| 7,313,575 B2 | 12/2007 | Carr et al. |
| 7,349,900 B1 | 3/2008 | Qin |
| 7,373,357 B2 | 5/2008 | Iyer et al. |
| 7,383,255 B2 | 6/2008 | Desai et al. |
| 7,421,709 B2 | 9/2008 | Watson et al. |
| 7,433,879 B1 | 10/2008 | Sharma et al. |
| 7,543,024 B2 | 6/2009 | Holstege |
| 7,571,173 B2 | 8/2009 | Yang et al. |
| 7,644,066 B2 | 1/2010 | Krishnaprasad et al. |
| 7,657,780 B2 | 2/2010 | D'Souza et al. |
| 7,743,019 B2 | 6/2010 | Shah et al. |
| 7,761,586 B2 | 7/2010 | Olenick et al. |
| 7,827,562 B1 | 11/2010 | Hoerle et al. |
| 7,831,655 B2 | 11/2010 | Upton |
| 7,861,212 B1 | 12/2010 | Dubagunta |
| 7,895,220 B2 | 2/2011 | Evans et al. |
| 7,904,487 B2 | 3/2011 | Ghatare |
| 7,970,779 B2 | 6/2011 | Smirnov et al. |
| 8,037,052 B2 | 10/2011 | Kariathungal et al. |
| 8,077,059 B2 | 12/2011 | Davies et al. |
| 8,090,733 B2 | 1/2012 | Bayliss |
| 8,200,635 B2 | 6/2012 | Mayer et al. |
| 8,275,779 B2 | 9/2012 | Eggebraaten et al. |
| 8,356,036 B2 | 1/2013 | Bechtel et al. |
| 8,359,323 B2 | 1/2013 | Klets et al. |
| 8,386,442 B2 | 2/2013 | Haudenschild et al. |
| 8,484,252 B2 | 7/2013 | Grosset et al. |
| 8,515,903 B2 | 8/2013 | Ferrel et al. |
| 8,595,175 B2 | 11/2013 | Vickers et al. |
| 8,606,768 B2 | 12/2013 | Mathur et al. |
| 8,631,046 B2 | 1/2014 | B'Far et al. |
| 8,682,921 B2 | 3/2014 | Park et al. |
| 8,706,684 B2 | 4/2014 | Chilakamarri et al. |
| 8,805,859 B2 | 8/2014 | Bohner et al. |
| 8,850,057 B2 | 9/2014 | Natoli et al. |
| 8,874,551 B2 | 10/2014 | Rosjat et al. |
| 8,898,143 B2 | 11/2014 | Valentin |
| 8,949,233 B2 | 2/2015 | Hsiao et al. |
| 9,015,301 B2 | 4/2015 | Redlich et al. |
| 9,087,105 B2 | 7/2015 | Brown et al. |
| 9,135,297 B2 | 9/2015 | Maman et al. |
| 9,135,796 B2 | 9/2015 | Kalo |
| 9,158,786 B1 | 10/2015 | Walsh et al. |
| 9,201,874 B2 | 12/2015 | Szyperski et al. |
| 9,424,091 B2 | 8/2016 | Sarkar et al. |
| 9,449,061 B2 | 9/2016 | Prasanna et al. |
| 9,710,382 B2 | 7/2017 | Gschwind et al. |
| 9,773,053 B2 | 9/2017 | Lee et al. |
| 9,779,154 B2 | 10/2017 | Liao et al. |
| 9,824,021 B2 | 11/2017 | Gschwind |
| 10,025,565 B2 | 7/2018 | Garipov et al. |
| 10,025,568 B2 | 7/2018 | Mayer et al. |
| 10,157,195 B1 | 12/2018 | Panwar et al. |
| 11,256,709 B2 | 2/2022 | Haudenschild |
| 2002/0091680 A1 | 7/2002 | Hatzis et al. |
| 2002/0174207 A1* | 11/2002 | Battou .................. G06F 8/65 709/223 |
| 2003/0014617 A1* | 1/2003 | Tamboli .............. G06F 16/258 713/1 |
| 2003/0028620 A1 | 2/2003 | Woelfel et al. |
| 2003/0105811 A1 | 6/2003 | Laborde et al. |
| 2003/0130991 A1 | 7/2003 | Reijerse et al. |
| 2003/0172368 A1 | 9/2003 | Ugh et al. |
| 2003/0187831 A1 | 10/2003 | Bestgen et al. |
| 2003/0208493 A1 | 11/2003 | Hall et al. |
| 2004/0024653 A1 | 2/2004 | Edgardo et al. |
| 2005/0033743 A1 | 2/2005 | Robinson et al. |
| 2005/0052999 A1 | 3/2005 | Oliver et al. |
| 2005/0131901 A1 | 6/2005 | Richter |
| 2005/0278362 A1 | 12/2005 | Maren et al. |
| 2006/0031246 A1 | 2/2006 | Grayson |
| 2006/0047648 A1 | 3/2006 | Martin |
| 2006/0064623 A1 | 3/2006 | Fischer et al. |
| 2006/0074881 A1 | 4/2006 | Vembu et al. |
| 2006/0129559 A1 | 6/2006 | Sankaran et al. |
| 2006/0173873 A1 | 8/2006 | Prompt et al. |
| 2006/0190438 A1 | 8/2006 | Brei |
| 2006/0225029 A1 | 10/2006 | Flatow |
| 2007/0078877 A1 | 4/2007 | Ungar et al. |
| 2007/0130206 A1 | 6/2007 | Zhou et al. |
| 2007/0299936 A1 | 12/2007 | Borgendale et al. |
| 2008/0177748 A1 | 7/2008 | Rondot |
| 2008/0222121 A1 | 9/2008 | Wiessler et al. |
| 2009/0018999 A1 | 1/2009 | Petri |
| 2009/0019000 A1 | 1/2009 | Arends et al. |
| 2009/0094268 A1 | 4/2009 | Nicholson et al. |
| 2009/0125882 A1 | 5/2009 | Frigo et al. |
| 2009/0129755 A1 | 5/2009 | Rakib et al. |
| 2009/0144319 A1 | 6/2009 | Panwar et al. |
| 2009/0187344 A1 | 7/2009 | Brancaccio et al. |
| 2010/0169281 A1 | 7/2010 | Atluri et al. |
| 2013/0110798 A1 | 5/2013 | Millett et al. |
| 2013/0290338 A1 | 10/2013 | Lee et al. |
| 2014/0032608 A1 | 1/2014 | Comeau |
| 2015/0006254 A1 | 1/2015 | Fackrell et al. |
| 2015/0112948 A1 | 4/2015 | Fugate et al. |
| 2015/0286734 A1 | 10/2015 | Odutola |
| 2016/0117768 A1 | 4/2016 | Reskala et al. |
| 2016/0210355 A1 | 7/2016 | Krantz, III |
| 2017/0083682 A1 | 3/2017 | McNutt et al. |

(56) References Cited

U.S. PATENT DOCUMENTS

| | | | |
|---|---|---|---|
| 2017/0116343 | A1 | 4/2017 | Wu et al. |
| 2017/0124269 | A1 | 5/2017 | McNair et al. |
| 2017/0236129 | A1 | 8/2017 | Kholkar et al. |
| 2020/0034723 | A1 | 1/2020 | Nakanoya |

FOREIGN PATENT DOCUMENTS

| | | | |
|---|---|---|---|
| CN | 1904885 | | 1/2007 |
| CN | 101604237 | | 12/2009 |
| CN | 101807816 | A | 8/2010 |
| CN | 101952805 | | 1/2011 |
| CN | 102207980 | | 10/2011 |
| CN | 103218402 | | 7/2013 |
| CN | 103902634 | | 7/2014 |
| CN | 105389378 | | 3/2016 |
| CN | 106156330 | | 11/2016 |
| CN | 106227824 | | 12/2016 |
| CN | 106933869 | | 7/2017 |
| CN | 108446289 | | 8/2018 |
| DE | 10137329 | | 2/2003 |
| KR | 20060032463 | | 4/2006 |
| WO | 2005008358 | | 1/2005 |
| WO | 2018007822 | | 1/2018 |

OTHER PUBLICATIONS

Freier et al., BioDataServer: a SQL-based service for the online integration of life science data, Dec. 31, 2002.
Madduri et al., A configuration management database architecture in support of IBM Service Management, Dec. 31, 2007.
Devi et al., A Model for Information Integration Using Service Oriented Architecture, Jun. 30, 2014.
Cheong et al., A RDF-based semantic schema mapping transformation system for localized data integration, Aug. 20, 2009.
Mason et al., Dynamic Database Integration in a JDBC Driver, Dec. 31, 2005.
Roth et al., Information integration: A new generation of information technology, Oct. 31, 2002.
Muilu et al., The federated database—a basis for biobank-based post-genome studies, integrating phenome and genome data from 600 000 twin pairs in Europe, Jul. 31, 2007.
Min et al., Integration of prostate cancer clinical data using an ontology, Dec. 31, 2009.
Biswal, A Noble Design Approach towards Distributed System Architecture, Dec. 31, 2010.
Bao et al., An EAI Integration Framework Based on J2EE, Dec. 31, 2009.
Prodromidis et al., Meta-learning in distributed data mining systems: Issues and approaches, Dec. 31, 2000.
Zhang et al., Multi-Database Mining, Jun. 30, 2003.
An article entitled "Components Interoperability through Mediating Connector Patterns" by Spalazzese et al., Component and Service Interoperability (WCSI10) 2010, Retrieved from the Internet: https://arxiv.org/abs/1010.2825.
An article entitled "Automated Synthesis of Mediators to Support Component Interoperability" by Bennaceur et al., IEEE Transactions on Software Engineering (vol. 41, Issue: 3, Mar. 1, 2015), Retrieved from the Internet: https://ieeexplore.ieee.org/document/6936339.
An article entitled "The Scalable Adapter Design Pattern: Enabling Interoperability Between Educational Software Tools" by Harrer et al., IEEE Transactions on Learning Technologies ( vol. 1 , Issue: 2 , Apr.-Jun. 2008 ), Retrieved from the Internet: https://ieeexplore.ieee.org/document/4685888.
An article entitled "Automatic Translation of Heterogeneous Data Models" by Naz et al., International Journal of Computer and Communication Engineering, vol. 1, No. 1, May 2012, Retrieved from the Internet: http://www.ijcce.org/ show-7-145-1.html.
Accelerated Examination Search, (Search Report) conducted Jul. 3, 2019, by Cardinal Intellectual Property.
Accelerated Examination Search, (Search History) conducted Jul. 3, 2019, by Cardinal Intellectual Property.
European Search, (Search Report) conducted Jul. 28, 2023 by European Patent Office.
"DirXML Administration Guide", Nov. 1, 2000, XP002309370, Retrieved from the Internet [retrieved on Oct. 30, 2003]: URL:http://www.novell.com/documentation/dirxml10/pdfdoc/dirxml/dirxml.pdf.
"Novell DirXML Administration Guide", Jan. 1, 2002, XP002309371, Retrieved from the Internet [retrieved on Nov. 24, 2004]: URL:http://www.directory-info.com/DirXML/dirxmlAdmin.pdf.
Frigo et al., "Reducers and other Cilk ++ Hyperobjects," SPAA'09, Calgary, Alberta, Canada, Aug. 11-13, 2009.
Huang et al., "The Integration of Heterogeneous Databases Based on XML Middleware," Journal of Southwest University, vol. 32, No. 9, pp. 141-146, Sep. 30, 2010.
Pandit et al., "Hyper Object Data Model: A Simple Data Model for Handling Semi-structured Data," Part of the Lecture Notes in Electrical Engineering book series (LNEE, vol. 298), Jan. 1, 2014.
Sandvad, "Hypertext in an Object-Oriented Programming Environment," WOODMAN'89: Workshop on Object-Oriented Document Manipulation, Rennes, France, May 29-31, 1989.
Patent Examination Report No. 1 issued by IP Australia in Australian application AU2011313859, Jul. 1, 2014.
Office Action and Search Report issued by State Intellectual Property Office in Chinese application CN2011800572950, Feb. 8, 2014.
Office Action issued by State Intellectual Property Office in Chinese application CN2015101023221, Jun. 13, 2018.
Search Report issued by State Intellectual Property Office in Chinese application CN2015101023221, Jun. 4, 2018.
Extended European Search Report issued by European Patent Office in European application EP 11833213.9, Apr. 4, 2014.
Communication pursuant to Article 94(3) EPC issued by European Patent Office in European application EP 11833213.9, Nov. 3, 2015.
Communication pursuant to Article 94(3) EPC issued by European Patent Office in European application EP 11833213.9, Feb. 1, 2019.
Examination Report issued by Korean Intellectual Property Office in UAE application 0383/2013, Apr. 15, 2018.

* cited by examiner

METHOD AND SYSTEM FOR ADAPTING PROGRAMS FOR INTEROPERABILITY AND ADAPTERS THEREFOR

RELATED APPLICATIONS

This application is a continuation of U.S. patent application Ser. No. 17/651,403, filed Feb. 16, 2022, which is a continuation of U.S. patent application Ser. No. 16/542,259, filed Aug. 15, 2019, now U.S. Pat. No. 11,256,709. All of the above applications are hereby incorporated herein by reference in their entirety.

FIELD OF THE INVENTION

The present invention relates in general to a method and a system for adapting software programs for interoperability. It further relates to adapters for enabling different programs to achieve interoperability.

BACKGROUND OF THE INVENTION

There is no admission that the background art disclosed in this section legally constitutes prior art.

Currently, programs such as database programs employ a variety of different data models, interface languages, naming conventions, data semantics, schemas, and data representations. Thus, a fundamental problem is the sharing of heterogeneous information among a variety of resources. The diversity among data from different programs may create serious barriers where interoperability among such diverse programs may be highly desirable but was heretofore unattainable.

Although there have been many attempts directed at heterogeneous databases, a significant need continues to exist for design, engineering, and manufacturing applications to be able to easily access and import data in an efficient and effective manner. Efforts to develop global query languages do not satisfactorily address the large group of users who may want to see the world of external data as if it were an extension of their existing system and its specialized representation. These users may not wish to learn a different global representation—and more importantly, their expensive design tools may only work with their one specialized representation.

Database gateways, Common Object Request Broker (COBRA), and Open Database Connectivity (ODBC) interfaces attempt to address heterogeneity, but only do so at a relatively superficial level. Thus, there are serious drawbacks to even beginning to achieve universal program interoperability.

In all these cases, programmers must still write the application code to invoke the several functions designed in an interface between programs to somehow enable them to interoperate, thus creating unwanted and undesirable expense and time delays. Data transformations and reformatting may be needed on the source side of the application programming interface (API), the target side of the API, or often on both sides. All of this is left to the programmers, who must implement this interoperability functionality on a case by case basis, and thus at great expense for the desired implementation. Unfortunately, there is little or no pre-existing software from which these translators can be built, and each effort usually begins from scratch. While some vendors offer import translators from a few common formats, in general these do not provide sufficient interoperability.

Moreover, if the target use of the data expects non-relational data (e.g., linked, nested, or other format), then additional data transformation may be required. Normally this too can involve a significant prohibitively expensive programming effort with unwanted time consuming requirements. Even within the relational data mode, there usually are several different ways of designing the relational tables—that is, there usually is more than one way to normalize the data. If the application requires the data differently than the API provides, then data transformations are usually required. Thus, it is often necessary for an organization to write expensive and time consuming specialized translators for their particular requirements.

Other interoperability drawbacks frequently occur in a large modern enterprise. It is inevitable that different parts of the organization may use different systems to produce, store, and search their critical data. This diversity of data sources may be caused by many factors including lack of coordination among company units, different rates of adopting new technology, mergers and acquisitions, and geographic separation of collaborating groups. Yet, it is only by combining the information from these various systems that the enterprise may be able to realize the full value of the data they contain. Thus, program interoperability is increasingly more perplexing in modern large enterprises.

In the finance or healthcare industries, for example, mergers are an almost commonplace occurrence. The company resulting from a merger inherits the data stores of the original institution or institutions. Many of those data stores may often be from different manufacturers. Both the acquirer and the target may have had one or more document management systems for storing text documents. Each may have had applications that compute important information such as, for example, the risk of granting a loan to a given customer, or mine for information about customer buying patterns.

After the merger, the new company may require access to the customer information from both sets of data stores, to analyze its new portfolio using existing and new applications, and, in general, to use the combined resources of both institutions through a common interface. The company may also require the ability to identify common customers and consolidate their accounts, even though the customer data may be stored in different databases and in different formats. These are all aspects of program interoperability, and all may pose hefty and unduly expensive challenges in the implementation process. Also, the implementation typically requires unwanted lengthy delays to achieve the desired interoperability.

Another attempt at interoperability is the establishment of a data warehouse, which is usually built by loading data from one or more data sources into a newly defined schema in a warehouse database. The data is often cleansed and transformed in the load process. Changes in the underlying sources may cause changes to the load process, and the part of the application that deals with data analysis must be protected. New data sources may introduce changes to the schema, requiring that a new load process for the new data be defined. However, any functions of the new data source that are not a standard part of the warehouse database management system usually must be re-implemented in the warehouse database system or as part of the application, frequently at unwanted expense and wasted time for installation.

A solution based on warehousing alone may be impractical or not cost effective for various other reasons. For example, it is not always feasible to move data from their original location to a data warehouse, and as described above, warehousing comes with its own maintenance and implementation costs.

The use of a database federation system is still another attempt at achieving universal interoperability. The term "database federation" refers to an architecture in which a database management system provides uniform access to a number of heterogeneous data sources. However, the time and expense of designing and implementing such a system is usually undesirable and unwanted. Even then it is typically limited to relational databases only and not to other formats such as hierarchical or other forms. Thus, such a limited architecture is not at all well suited for universal interoperability. Scaling up by adding not previously known populated data sources can be an external challenge at best, if not totally impractical for some applications.

In general, there is unwanted expense and time required to create interfaces to achieve some measure of program interoperability such, for example, as where a large group of heterogeneous data sources are employed. Such manual work by programmers is usually totally undesirable and unwanted, if not daunting.

It would be extremely desirable to have a system and method of enabling interoperability for any number of different programs in an automatic or substantially automatic, and highly efficient and effective manner. Such a system and method should safe guard against human errors. Additionally, it would be highly desirable to have a program adapter for helping to facilitate universal interoperability among different programs. The adapters would operate in an automatic or substantially automatic manner to eliminate or greatly reduce the need for programmers developing interfaces for previously unknown programs. The adapters should be able to enable interoperability even among programs having previously unknown data arrangements and meanings, and the implementation may be completed substantially without human intervention. Thus, previously unknown programs could be readily accessed by other programs for interoperability purposes to extend globally a system in an essentially unlimited manner and in a fast and efficient approach.

Adapters have been used for helping accessing databases achieve access with other programs. For example, reference may be made to the following U.S. Pat. Nos. 9,201,874 B2; 9,135,297 B2; 6,880,151 B2; 6,792,431 B2; 5,970,490; and published U.S. patent application 2014/0032608 A1.

Also, the following are non-patent published articles: Freir, Andreas, Hofestadt, Ralf, Lange, Matthias, Scholz, Uwe, Stephanik, Andreas, "BioDataServer; A SQL-based Service for the Online Integration of Life Science Data", In Silico Biology 2, 0005 Bioinformation Systems (2002). Devi, C. Punitha, Venkatesan, V. Prasanna, Diwahar, S., Shanmugasundaram, G., "A Model for Information Integration Using Service Oriented Architecture", I.J. Information Engineering and Electronic Business, (published online in MECS www.mecs-press.org/June 2014).

For example, in published US patent application 2014/0032608 A1, there is disclosed a database adapter which claims to reduce "the time and expense associated with adapting an application program to operate with a second database different from a first database that the application is designed to access". First, however, such an adapter must be manually customized for each of the two different database programs. Such customization is, of course, unduly expensive and undesirably time consuming to implement, especially when there can be a large number of different possible heterogeneous programs to interoperate, in an efficient and effective manner. Second, the disclosed adapter is designed to instantiate both databases, which may not be desirable for most applications.

U.S. Pat. No. 6,792,431 to Tamboli and U.S. Pat. No. 9,201,874 to Szyperski disclose adapters and techniques for data mapping information to assist interoperability. In the Tamboli patent, there is disclosed adapters used for data integration. Identifying attributes are displayed by a user workstation. The attributes are "actually stored in a catalog". (Column 12, lines 43-49). The user can then enable "execution of a transfer, to transfer particular identified data from a source native repository to a destination native repository. User interfaces in such embodiments are capable, when ordered to do so, of writing to a transfer cart, catalog keys from the identifying attributes for all native records ordered transferred by the user. . . . The user interface then in typical embodiments, writes a catalog key into a transfer cart (242), one key for each transfer record." (Column 13, lines 1-26). In order to enable this operation, programmers "write code for adapter functions or member methods that is either written in the language of a database management system for a native repository or that calls application programming interfaces ("APIs") supported by a native repository or its database management system." (Column 23, lines 8-12). When mistakes were made in the mapping, to "the extent that the mapping needs to be amended, no programming is required, only text editing. To the extent that an adapter needs to be amended, only a small amount of programming is involved, just enough in the current example to add the one excluded data element. . . . The fact . . . that human error or human choice may as a practical matter exclude data elements in a way that fails the definition of full unison, 'amendments are required.'" (Column 25, lines 29-40).

Thus, the mapping apparently requires amending due to human error in manually entering information on a workstation. Such human errors and manual corrections may well be costly and highly undesirable. The Tamboli technique of requiring the "user interface then, in typical embodiments, writes a catalog key into a transfer cart (242), one key for each transfer register", is subject to human error for every record in the system. Therefore, severe accuracy problems could easily and predictably result.

In the Szyperski patent, an attempt is made to "correlate different nominal types together based on a minimal set of common shapes or structures. In one implementation, a developer identifies a number of different nominal types of interest (source types), and identifies the minimum set of common type shapes to be accessed by an application program. The minimum set of common type shapes can then be used to create an intermediate type (target type) to which each of the other different source types can be mapped. For example, one or more proxies can be created that map shapes of the one or more source types to corresponding shapes of the created target type. The application program created by the developer, in turn, can access, operate on, or otherwise use the mapped data of each different source type through a single target type." (Abstract, lines 2-15).

However, for the purpose of data mapping, the developer must identify different nominal types of interest (source types), and identify the minimum set of common type shapes to be accessed by an application program. Such programming can be unduly expensive and time consuming. Also, it is apparent that the developer must already know the types before he or she can identify a number of different nominal types, and further can identify the minimum set of common type shapes. Thus, Szyperski requires prior knowledge of certain programs before mapping can even take place.

BRIEF DESCRIPTION OF THE DRAWINGS

In order to better understand certain embodiments and to see how the same may be carried out in practice, non-limiting preferred embodiments of the invention will now be described with reference to the accompanying drawings, in which.

DETAILED DESCRIPTION OF CERTAIN EMBODIMENTS

Figure 1:
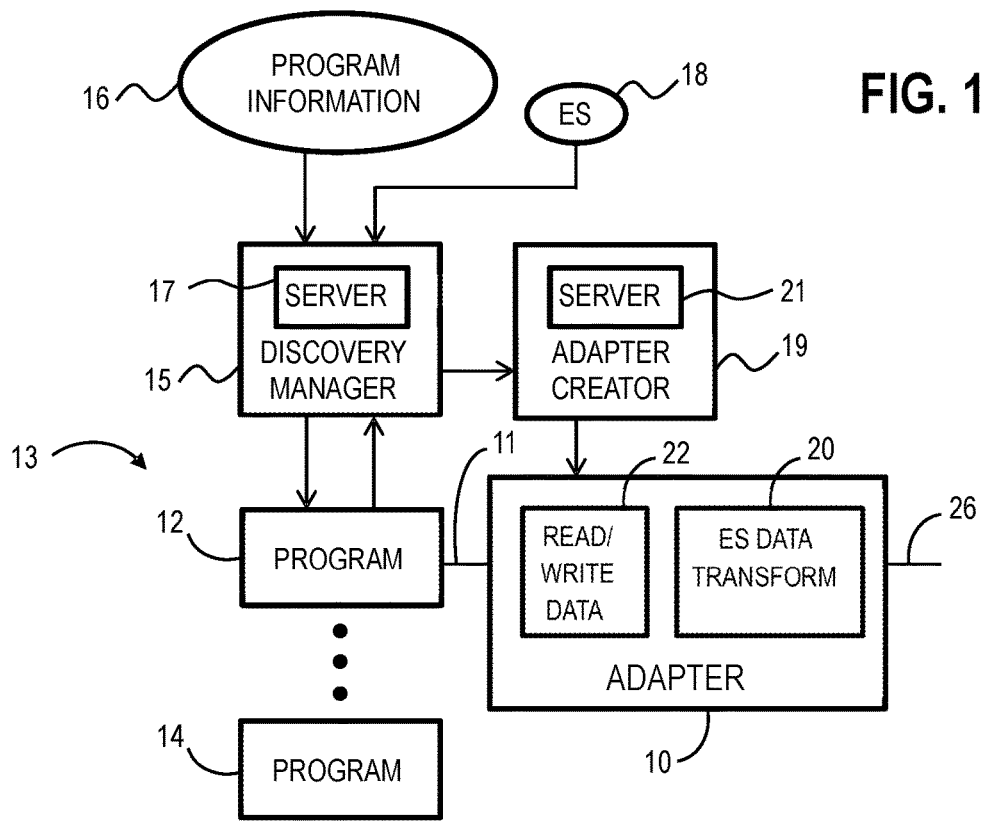
FIG. 1 is a symbolic block diagram showing a creation of adapters for use with different programs to enable interoperability among them according to various embodiments.

Certain embodiments will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the apparatus system, components and methods of the present invention, as represented in the drawings, is not intended to limit the scope of the invention, as claimed, but is merely representative examples of one or more of the embodiments of the invention.

According to an embodiment, a system facilitates interoperability between first and second different programs. The programs may have prior unknown data meanings and arrangements. The system includes first and second bidirectional exchange standard adapters each including first and second data functional transforms. The transforms may be a conversion function of data structures and data formats between the first and second programs and a common exchange standard. The first and second adapters also each include communication transfer reading and writing data for the respective first and second programs. A communication link may connect the first and second adapters for conveying exchange standard information bidirectionally.

The data functional transforms, in accordance with various embodiments, may be created without human intervention, and enable the programs to interoperate. The data structures and data formats, as well as the read/write data for each program are learned by discovery managers. Thus, the data transforms and the read/write data for each adapter enable adapter creators to create the adapters, which all may be done without human intervention.

It is to be understood that the term "data functional transform" as used herein may also be referred to herein variously as "ES data transform", "transform", or "ES program data transform".

Another embodiment relates to a method of creating the bidirectional exchange standard adapters. The method includes receiving program data meanings and corresponding data locations from a given program. It is then determined whether the received program meanings are equivalent to desired meanings of an exchange standard. A further determination may be made as to whether data from the received data locations of the given program are consistent with corresponding data of the exchange standard.

Thus, if data meanings may be available, the data for those meanings may be verified by analyzing the associated data. If no meanings are available, the data itself may be analyzed to determine if any of the data contained in the unknown program may be of interest, all may be completed without human intervention in a fast and efficient manner.

If equivalency and/or consistency are determined, a two-way functional transform may then be created. The functional transform may be a function of data structure and data format for a conversion of data between the given program and the corresponding exchange standard. The functional transform is provided for a given bidirectional exchange standard adapter to facilitate interoperability between the given program and a different program having another bidirectional exchange standard adapter.

The method of creating may include a discovery manager, which facilitates searching for data meanings for data stored in the given program. The searching may include receiving via the discovery manager an application programming interface (API).

The method of creating may include a discovery manager, which facilitates searching for data meanings for data stored in the given program in the form of metadata.

The method of creating using the discovery manager may include determining the desired exchange standard meaning with the received program data meanings to determine whether or not the exchange standard meanings are equivalent with corresponding program data meanings.

The method of creating using the discovery manager may include determining if a program data profile exists and an exchange data profile exists. If they exist, a determination may then be made via the discovery manager whether consistency exists between the program data profile and the exchange standard data profile.

The method of creating may include a determination if the discovery manager determines that either the equivalency of the data meaning and/or the consistency of the data profile exists, the adapter may then be created by an adapter creator unless (1) the program data meaning is not equivalent to the exchange standard data meaning, or (2) the program data profile is not consistent with the exchange standard data profile.

The method of creating may include creating rules defining read and write commands and functional data transforms.

Yet another embodiment relates to a bidirectional exchange standard adapter which enables a given program to interoperate with a different program having another bidirectional exchange standard adapter. The adapter may include one or more hyper objects including one or more rules defining a two-way functional data transform. The functional transform may be a data conversion function of data structures and data formats for the given program and for a given exchange standard. The one or more hyper objects may also define rules for data reading and data writing for the given program. As a result, intercommunication with another bidirectional exchange standard adapter is facilitated to provide interoperability between the given program and the different program.

The bidirectional exchange standard adapter may further include a communication link for communication between the adapter and another bidirectional exchange standard adapter for conveying two-way exchange standard information.

In an embodiment, the adapter hyper object rules enable fast and efficient implementation in a well-known and accepted hyper object framework. The rules may also be revised or otherwise changed dynamically.

Referring now to the drawings, and more particularly to FIG. 1 thereof, there is shown a bidirectional exchange standard adapter 10 for enabling a given program such as a program 12 of a group of programs 13 to interoperate with a different unknown program such as a program 14. The group of programs 13 may be a variety of different programs, such for example as databases, applications and other types and kinds of programs. Also, the data meanings may not be previously known among the various programs 13. According to various embodiments, by equipping each one of programs 13 with an exchange standard adapter similar to the adapter 10, the programs 13 may still be able to interoperate with one another and share data with one another, even though the structure and arrangement of the data of each one of programs 13 may be different and previously unknown.

In order to create the adapter 10 for the program 12, a discovery manager 15 may be employed to discover the meaning of certain desired data utilized or stored in the program 12. For this purpose, certain received program information indicated at 16 informs the discovery manager 15 how to find data meanings and corresponding data locations, which may be provided to a server 17 of the discovery manager 15.

According to various embodiments, if such data meanings and data locations may not be available, the program data (P-DATA), for example, may be analyzed automatically or semi-automatically to learn data meanings and location from the data itself.

According to embodiments, a given exchange standard (ES), as generally indicated at 18, is received by the discovery manager 15. The exchange standard data ES-DATA may include data representing desired given information including, but not limited to, desired data meanings, data structure and format, data profiles and others.

Should the discovery manager 15 learn that the given desired data meanings and their locations corresponding to the given exchange standard ES were discovered and/or the program data P-DATA is consistent with the exchange standard data ES-DATA, an adapter creator 19 having a server 21, then may create data functional transforms for data structure and data formats as well as read-write program commands.

Once created, the transform such as the ES program data transform may be assembled in the adapter 10 as indicated at 20. Additionally, communication transfer read/write data may also be determined by the discovery manager 15 and used for accessing the program 12 by the adapter creator 19 for providing read and write commands for the given program 12, and assembled in the adapter 10 as indicated at 22.

Figure 2:
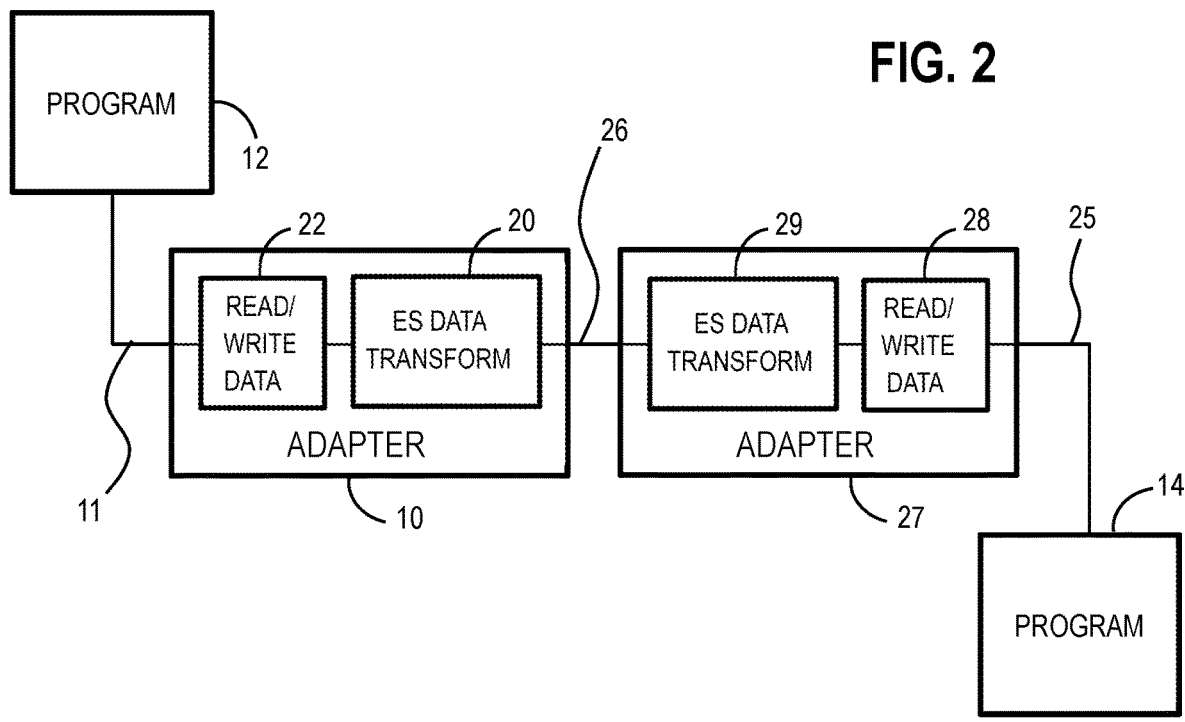
FIG. 2 is a symbolic block diagram of a pair of adapters connected to a pair of different programs to enable them to interoperate according to various embodiments.

Referring now to FIG. 2, upon completion of the adapter 10, the given program 12 may be connected via its adapter 10 through an ES data communication link 26 to a different bidirectional exchange standard adapter such as an adapter 27 in turn coupled via a link 25 to a different program such as the program 14 to facilitate interoperation between the programs 12 and 14. Assume that the adapter 27 may have been created by the discovery manager 15 and the adapter creator 19, or by its own similar dedicated discovery manager (not shown) and adapter creator (not shown). The adapter 27 includes an ES program data transform 29 which converts bidirectionally between program information in the program 14 and the exchange standard ES in a similar manner as the transform 20 of the adapter 10 for use with the program 12. Similarly, the adapter 27 may include a communication transfer read/write data 28, which is similar in function to the communication transfer data 22 of the adapter 10, and which provides reading and writing commands for the program 14.

As an example, assume that the given program 12 contains information in the Italian language, and the different program 14 contains information in the Chinese language. Further assume that the exchange standard ES is in the English language. The program 12 may request information from the different program 14 by sending a message such as a query in Italian via the link 11, the adapter 10, the ES data communication link 26, the adapter 27, and the link 25 to the program 14. In so doing, the program request from the program 12 in the Italian language is sent using the read/write commands 22 and is transformed into the English language via the ES data transform at 20 and conveyed by the link 26 and the adapter 27 to provide the request in English. The adapter 27 in turn converts the English language request into the Chinese language by means of the data transform 29 for presentation to the program 14. The Chinese language request is conveyed to the program 14 via the link 25 by using the read/write data 28 for the program 14.

The program 14 may then respond in Chinese via the link 25 to the adapter 27, using the read/write commands pursuant to the data 28. The adapter 27 converts the Chinese language information into English by means of the data transform 29 for providing the English response via the ES data communication link 26 to the adapter 10. The adapter 10 then converts the English data response via the data transform 20 into the Italian language for supplying the Italian information using the read/write data 22, via the link 11, to the program 12. As a result, two-way communication may take place between the programs 12 and 14 to provide interoperability, even though the two programs may be different and communicate in different languages, or other differences.

Figure 3:
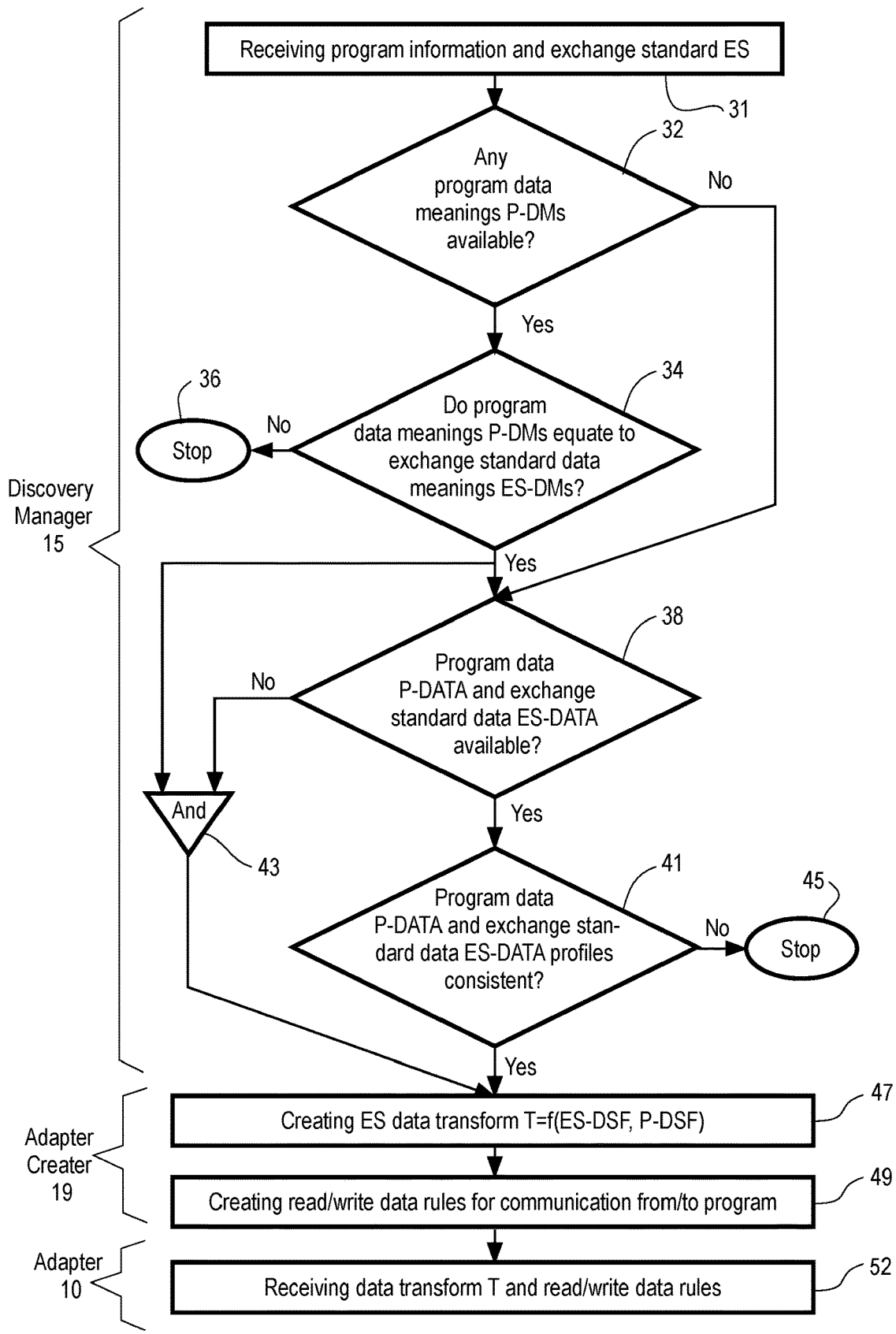
FIG. 3 is a flow chart diagram of methods of creating adapters for facilitating different programs to interoperate according to various embodiments.

Referring now to FIGS. 1 and 3, in accordance with various embodiments, the method or process of creating the bidirectional exchange adapter 10 will now be described in greater detail. Assume that the program 12 is a database program and employs previously unknown data meanings. However, other programs such as the group 13 of programs of FIG. 1 may be different programs such as applications, and may have different unknown data arrangements. The group 13 of programs may have other different adapters such as adapter 27 made in a similar way as adapter 10.

At box 31, program information and the exchange standard ES are received by the discovery manager 15. The desired healthcare information such as certain patient information may, for example, be desired. Assume the program information may inform the discovery manager 15 how to find data meanings (P-DMs) and locations therefor contained in program 12. The program information received by discovery manager 15 may for example be in the form of an application programming interface (API), metadata or data meanings and locations or manually receiving information for program 12.

At decision box 32, the discovery manager 15 determines whether or not any program data meanings (P-DMs) may be available from program 12. If available at decision box 34, it is determined whether or not the available program data meanings (P-DMs) for program 12 equate to corresponding exchange standard data meanings (ES-DMs). For example, the program data meaning (P-DM) for program 12 may include "temperature" or "temp" for the temperatures recorded for a given patient. Assuming that at least one of the exchange standard data meanings is "temperature", then equality is determined by the discovery manager 15. Equality determination means that the program 12 contains a program data meaning P-DM which equates to an exchange standard data meaning ES-DM such in this present example as "temperature". This operation may be accomplished by processing a comparison or matching function.

Since in the present example it is assumed that exchange standard data meaning ES-DM equates to corresponding program data meaning P-DM or that no program data meanings are available, at decision box 38, the discovery manager 15 determines whether or not program data P-DATA and exchange standard data ES-DATA are available.

As indicated at box 41, since P-DATA and ES-DATA are available, the discovery manager 15 may determine whether or not the data program P-DATA is consistent with the exchange standard data ES-DATA. The data may be similar to corresponding ES-DATA, but not necessarily the same. Consistency may be defined in various ways including but not limited to similar, compatible, possible or other. The program data may not be consistent if the P-DATA is out of the data range described in the exchange standard. For example, the program data "1000" could be determined not to be a "temperature" of a human patient, by comparing the program data with an exchange standard data of a range of physiologic possible temperatures. Other consistency checking techniques are hereinafter described.

Assume that the P-DATA and ES-DATA are available. Then at decision box 41, the program data P-DATA may be determined by the discovery manager 15 to be consistent with a corresponding exchange standard data ES-DATA. If consistent, then the adapter creator 19 may create transforms for the adapter 10.

As indicated at boxes 34 and 36, if the program data meanings P-DMs do not equate to the exchange standard data meanings ES-DMs, then at the STOP box 36, the discovery manager 15 may determine that no further discovery of this data meaning will be undertaken by the discovery manager 15 and other data meanings may be processed, or the process may be terminated entirely.

If the discovery manager 15 at box 41 determines that there is no consistency between the program data P-DATA and the exchange standard data ES-DATA, then the discovery manager 15 as indicated at STOP box 45 may determine that no further discovery of this data meaning will be undertaken by the discovery manager 15 and other data meanings may be processed, or the process may be terminated entirely.

The discovery manager 15 may determine that (1) at box 34 the program data meaning P-DM does equate to the exchange standard data meaning ES-DM, and that (2) at box 38, program data P-DATA and exchange standard data ES-DATA are not available. Then, by means of an AND function 43, such as an AND gate or other techniques such as a software function, the adapter creator 19 may then provide functional transforms for the adapter 10 as indicated at box 47. Also if the discovery manager 15 determines that the data P-DATA and data ES-DATA are consistent as indicated at box 41, the ES data transform may then be created by the adapter creator 19, unless the program data is not consistent with the exchange standard data profile at STOP box 45.

According to various embodiments, by analyzing the program data, it can be determined if the program data in the program 12 may be of interest, even without the availability of any data meanings. Thus, an unknown program, such as program 12, according to embodiments may be analyzed by its data alone to determine if it is of interest as required by the exchange standard ES.

As indicated at box 47, the adapter creator 19 develops a functional data transform T which is a function of both exchange standard data structure/format (ES-DSF) and program data structure/format (P-DSF). The data structure may for some applications relate to the data units. For example, in the case of exchange standard data meaning ES-DM being "temperature", the ES-DSF may employ degrees centigrade as the units of measure for the exchange standard data, and the P-DSF may be expressed in degrees Fahrenheit. The adapter creator 19 may then employ a conventional conversion formula as at least a portion of the transform T for converting between degrees centigrade and degrees Fahrenheit. The data transform in general may be any mathematical function and/or logical operation.

The data format for the exchange standard (ES-DSF) may be in a binary format, whereas the program data format (P-DSF) may be expressed in the form of ASCII. The adapter creator 19 may, for example, employ a conversion formula as a portion of the transform T for converting between binary and ASCII formats.

As indicated in box 49, the adapter creator 19 also provides the data read and data write commands for communicating to and from the program 12.

Thereafter, as indicated at box 52, the adapter 10 receives the ES data transform T at 20 and the read and write data at 22 from the adapter creator 19.

Figure 4:
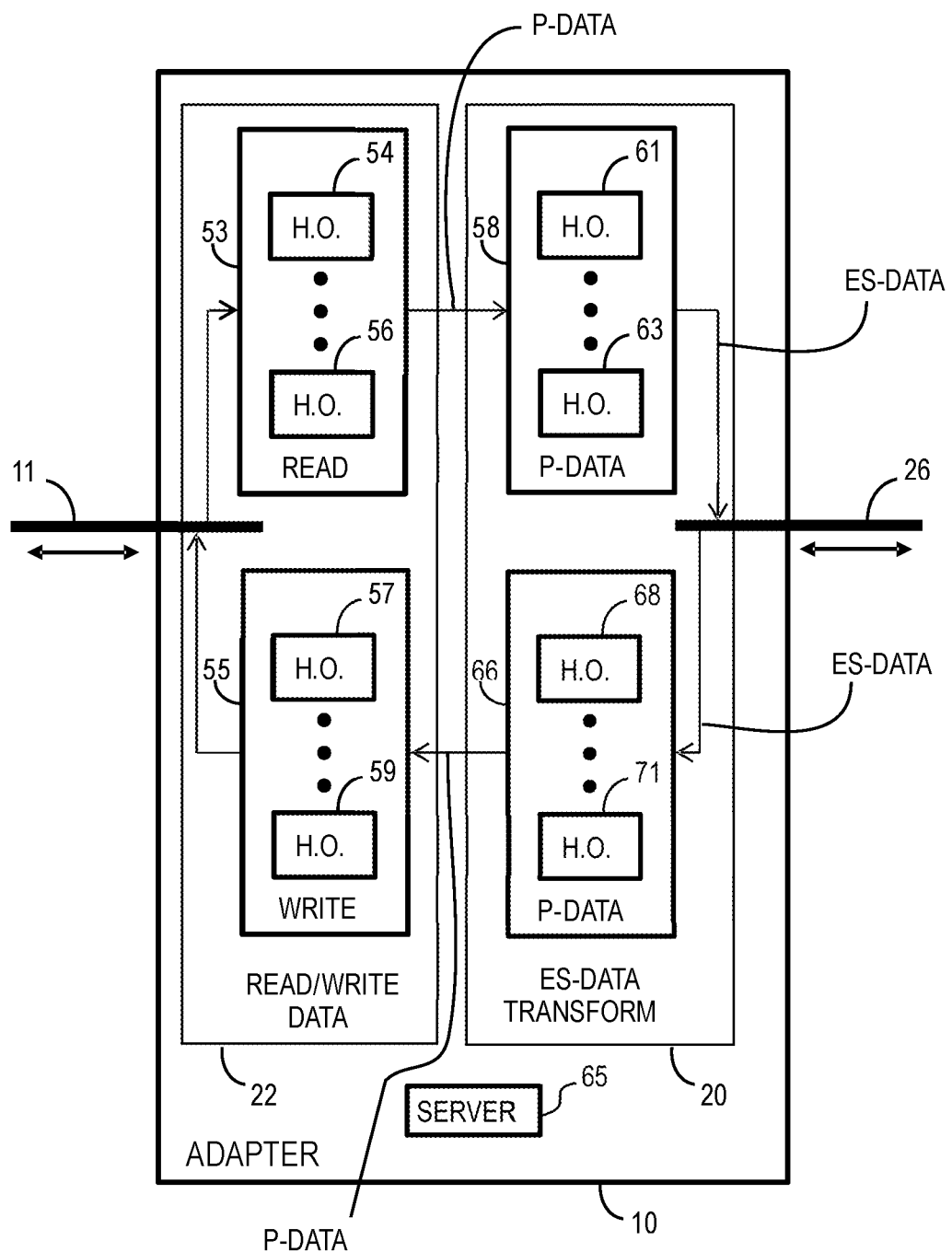
FIG. 4 is a more detailed symbolic block diagram of the adapter according to a currently preferred embodiment.

Referring now to FIG. 4, there is described in greater detail the adapter 10. The adapter 10, according to a preferred embodiment, may include a read group 53 of hyper objects such as hyper objects 54 and 56. The read group 53 of hyper objects receives information from the bidirectional link 11 coupled to the program 12, and forms part of the read/write data 22. The read group 53 conveys information to a program data group 58 of hyper objects such as a hyper object 61 and a hyper object 63. The program data group 58 forms a part of the ES data transform 20, and in turn, conveys the transformed data to the bidirectional link 26 and to another adapter such as the adapter 27. Thus, information may be conveyed from the program 12 via the bidirectional link 11 and the hyper object groups 53 and 58 to the bidirectional link 26 coupled to the adapter 27.

In the reverse direction, a program data group 66 of hyper objects such as a hyper object 68 and a hyper object 71 forms a part of the ES data transform 20, and conveys information from the bidirectional link 26 from the adapter 27. The information from the program data group 66 may be conveyed to a write group 55 of hyper objects such as a hyper object 57 and a hyper object 59, and which forms a part of the read/write data 22. The read/write data 22 conveys the information to the bidirectional link 11 coupled to the program 12. Thus, information may be conveyed from the adapter 27 via the link 26 and the hyper object groups 55 and 66 to the bidirectional link 11 coupled to the program 12.

The groups of hyper objects may be executed under the control of a server 65 and may be programmed with the read/write command rules generated according to, for example, an API or similar information of a program such as the program 12 for managing communication between the adapter 10 and the program 12. The rules or algorithms may contain complex functional formulas or equations in a simple expressive manner to implement the rule, such as described in connection with the transform T. The implementation is relatively straight forward for writing information such as Structured Query Language (SQL), as well as other more complex ones, as rules. Hyper object framework is well known and thus, rules may be dynamically changed relatively quickly and easily for dynamic updating as required in certain applications. The hyper objects do not contain data. See, for example, U.S. Pat. No. 8,386,442, which is incorporated by reference in its entirety.

Therefore, interoperability of programs may be achieved by the use of adapters according to various embodiments, even though the programs may be different and the data arrangements therein are unknown previously. Furthermore, through the use of the exchange standard, dynamic updating may be achieved by simply updating the exchange standard. Through the use of the discovery managers and adapter creators according to the various embodiments, the adapters may be created and updated even dynamically, without the need for expensive and time-consuming programming. Such techniques employed by the various embodiments enable addressing large data standards and requirements in modern industry, and facilitate flexibility and scaling requirements.

Considering now the technique according to various embodiments of determining from the program data P-DATA alone whether or not it may include desired data specified in the exchange standard data ES-DATA. According to certain embodiments, certain data profiles may be recognized by the discover manager 15. The data profile according to various embodiments may describe the intrinsic characteristics of the program data P-DATA, such as, for example, a data value range, a data hierarchical structure, a data statistical distribution, and others, for the data itself. A data profile of the exchange standard ES is preferably a high quality sample.

A high quality sample data curve from an exchange standard ES may be compared with an input data curve from the program 12. A variety of methods may be used to determine the consistency between the two data curves. For example, a cross-correlation method based on the "Two-Sample Kolmogorov-Smirnov Test" algorithm may be used to calculate the consistency of two data curves.

Figure 5:
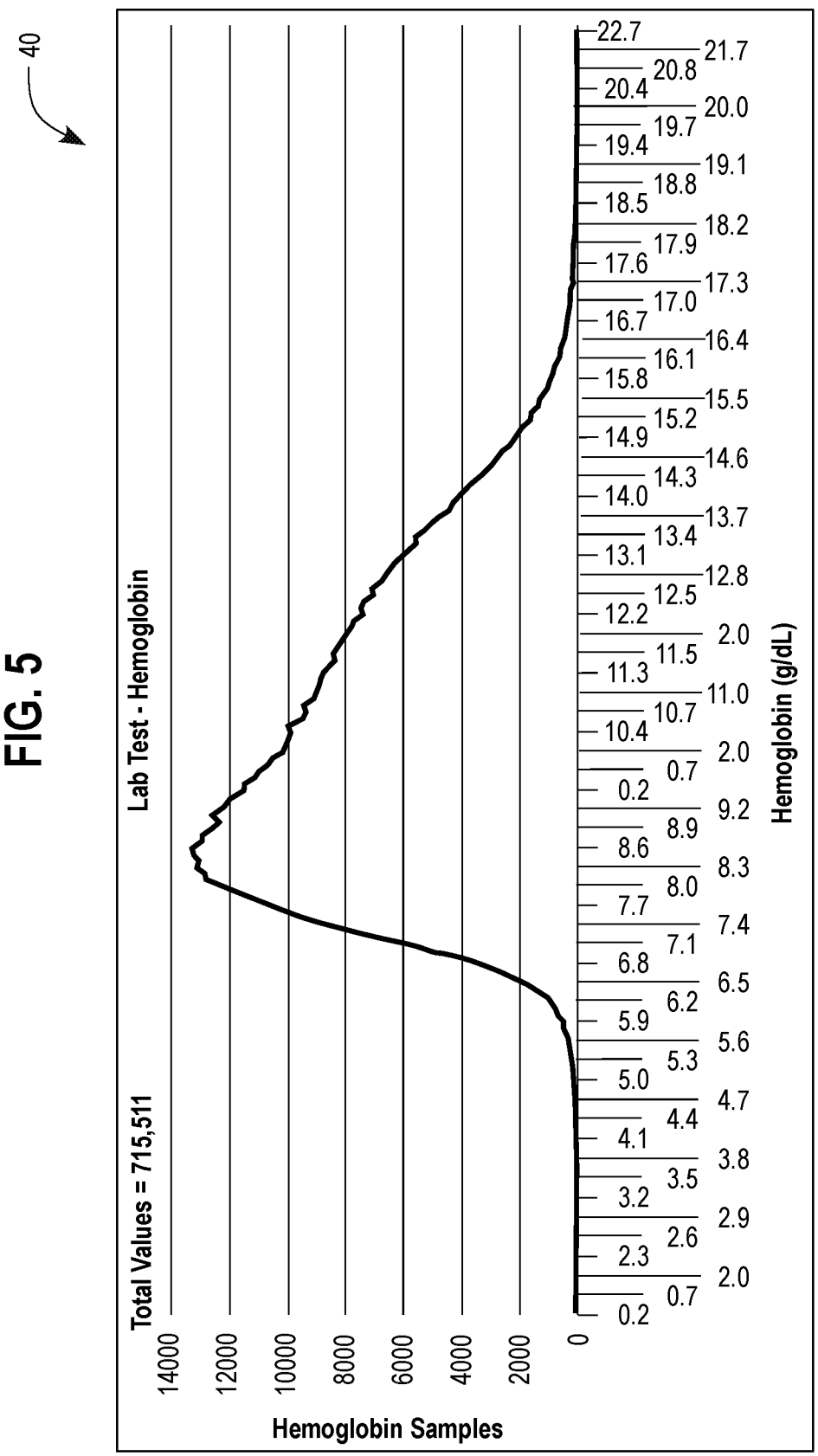
FIG. 5 is a diagram of a data profile from a given exchange standard data according to an embodiment.

In FIG. 5, there is shown an example for non-limiting explanation purposes only of an exchange standard data profile which may be derived from its underlying data. A data diagram 40 shown in FIG. 5 is a one-dimensional histogram forming a data profile. With particular reference to box 41 of FIG. 3, assume that program 12 is a healthcare oriented database program, and the exchange standard ES is designed to access desired data concerning patients having undergone hemoglobin testing. The data profile of diagram 40 of FIG. 5 illustrates the number of samples tested verses the hemoglobin values for various patient records to determine a finger print of a data profile.

Figure 6:
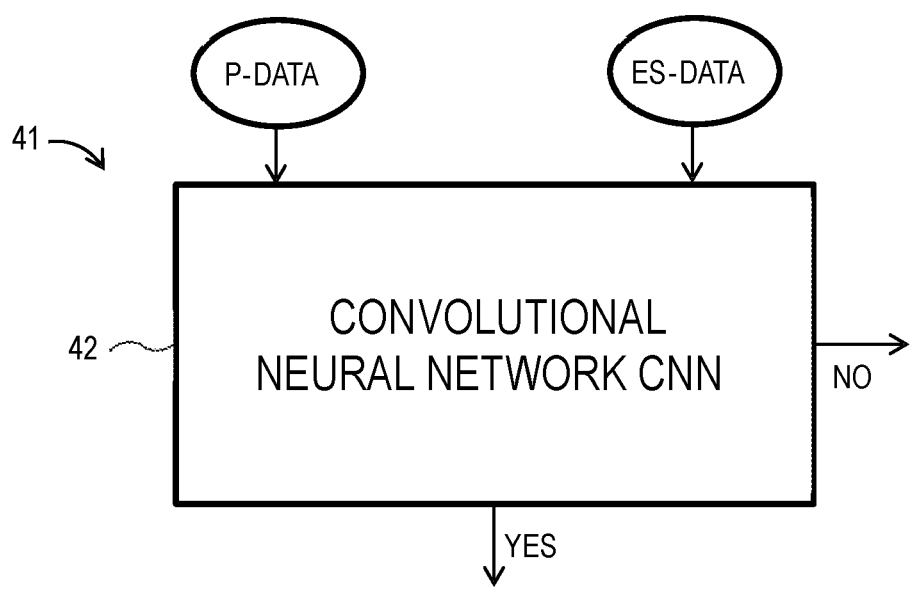
FIG. 6 is a software implementation of a profile consistency determination step of the flow chart of FIG. 3 according to a preferred embodiment.

On the X axis of the diagram 40, there is shown test values of hemoglobin test results for various patients. On the Y axis, there is listed the number of the hemoglobin samples corresponding to each value specified on the X axis. The total number of values for the test samples was 715,511. The result is the distinctive curve 40 to illustrate a distribution pattern of the data. This pattern is then the data profile for hemoglobin laboratory test results, and may be used as an exchange standard data profile. It should be understood that there may be many different types and kinds of data profiles which may be used according to various embodiments. Examples of data profiles may include, without limitation, electro cardiograms (ECGs), images, histograms and many others. Referring now to FIG. 6, a conventional Convolutional Neural Network (CNN) 42 may be used according to a preferred embodiment for the step 41 of the method of FIG. 3. The CNN may be trained to capture the invariant-representation (intrinsic shape) of a data curve. The trained CNN may also be used to compute a consistency score between two data curves. In the present example of a histogram curve 40 as shown in FIG. 6, the CNN is first trained to capture the intrinsic shape of the data curve 40 and also to compute a desired consistency score between two curves based on the curve 40 as the exchange standard. Then both the P-DATA from the program 12 as well as the exchange standard ES-DATA are streamed to the CNN for processing purposes. The results of the consistency determination may then be either a "yes" or "no" as indicated.

In view of that foregoing drawings and detailed descriptions of certain embodiments, it may become apparent to those skilled in the art that the disclosed and other embodiments relate to novel techniques for achieving program interoperability among and between different programs, despite the fact they may have previously unknown data. Adapters may be created for helping to achieve the desired interoperability by, at least in part, learning whether or not the program contains the desired data.

A method and system according to embodiments enable generalized program to program interoperability. The method and system employ an automatic or substantially automatic transform adapter for using a given exchange standard for two-way communication with a program. In order for the adapter to employ the exchange standard, a discovery manager may learn the program's data communications structure and/or format, and may learn data meaning information from the program. An adapter creator may derive a transform which converts the program's data communications structure and data meaning into the exchange standard. The transform may be used by the adapter to enable two-way communication with any adapter and/or program similarly employing the given exchange standard to achieve interoperability.

Although the invention has been described with reference to the above examples, it will be understood that many modifications and variations are contemplated within the true spirit and scope of the embodiments as disclosed herein. Many modifications and other embodiments will come to mind to one skilled in the art to which the invention pertains having the benefit of the teachings presented in the foregoing descriptions and the associated drawings. Therefore, it is to be understood that the invention shall not be limited in any way to the specific embodiments disclosed herein or modifications thereof, and that modifications and other embodiments are intended and contemplated to be included within the scope of the appended claims. Although specific terms are employed herein, they are used in a generic and descriptive sense only and not for purposes of limitation.

What is claimed is:

1. A method for enabling different programs to interoperate in an automatic or substantially automatic manner, comprising:
   providing a discovery manager;
   receiving, by the discovery manager, first program data meanings and corresponding data locations for a first program;
   searching, by the discovery manager, for the first program data meanings for data stored in the first program to determine if the first program data meanings are substantially equivalent to predetermined data meanings of an exchange standard;
   determining if data from the received data locations of the first program are substantially consistent with corresponding data of the exchange standard;
   creating a two-way functional data transform if substantial equivalency or substantial consistency is determined; and
   providing the two-way functional data transform for a first bidirectional exchange standard adapter to enable interoperability between the first program and a second program having a second bidirectional exchange standard adapter.

2. The method of claim 1, wherein the step of receiving, by the discovery manager, first program data meanings and corresponding data locations for a first program includes receiving an application programming interface.

3. The method of claim 1, wherein the step of receiving, by the discovery manager, first program data meanings and corresponding data locations for a first program includes receiving metadata from the first program.

4. The method of claim 1, wherein the step of searching, by the discovery manager, for the first program data meanings for data stored in the first program to determine if the first program data meanings are substantially equivalent to predetermined data meanings of an exchange standard includes comparing the predetermined data meanings of the exchange standard with the received first program data meanings to determine whether or not the predetermined data meanings of the exchange standard are substantially equivalent with corresponding first program data meanings.

5. The method of claim 1, wherein the step of determining if data from the received data locations of the first program are consistent with corresponding data of the exchange standard is performed by determining if a program data profile exists and an exchange standard data profile exists via the discovery manager.

6. The method of claim 5, wherein the discovery manager including a convolutional neural network.

7. The method of claim 1, further including creating a communication transfer transform including rules for data reading and/or data writing.

8. The method of claim 7, wherein the data transform and the communication transfer transform are assembled by an adapter creator for the exchange standard adapter.

9. The method of claim 1, wherein the step of determining if data from the received data locations of the first program are substantially consistent with corresponding data of the exchange standard includes a first program data meaning which equates to an exchange standard data meaning.

10. The method of claim 1, wherein the step of determining if data from the received data locations of the first program are consistent with corresponding data of the exchange standard includes determining if a first program data is out of a data range described in the exchange standard.

11. The method of claim 10, wherein the first program data includes one or more of intrinsic characteristics: a data value range, a data hierarchical structure, and a data statistical distribution.

12. The method of claim 1, wherein the step of creating a two-way functional data transform if substantial equivalency or substantial consistency is determined includes developing a functional data transform which is a function of both exchange standard data structure/format and program data structure/format.

13. A method for enabling different programs to interoperate in an automatic or substantially automatic manner, comprising:
   providing a discovery manager;
   receiving program data meanings and corresponding data locations for a first program;
   determining if the program data meanings are substantially equivalent to predetermined data meanings of an exchange standard;
   determining if data from the received data locations of the first program are substantially consistent with corresponding data of the exchange standard by determining if a program data meaning equates to an exchange standard data meaning;
   creating a two-way functional data transform if substantial equivalency or substantial consistency is determined; and
   providing the two-way functional data transform for a first bidirectional exchange standard adapter to enable interoperability between the first program and a second program having a second bidirectional exchange standard adapter.

14. The method of claim 13, wherein the step of receiving, by the discovery manager, first program data meanings and corresponding data locations for a first program includes receiving an application programming interface.

15. The method of claim 13, wherein the step of receiving, by the discovery manager, first program data meanings and corresponding data locations for a first program includes receiving metadata from the first program.

16. The method of claim 13, wherein the step of searching, by the discovery manager, for the first program data meanings for data stored in the first program to determine if the first program data meanings are substantially equivalent to predetermined data meanings of an exchange standard includes comparing the predetermined data meanings of the exchange standard with the received first program data meanings to determine whether or not the predetermined data meanings of the exchange standard are substantially equivalent with corresponding first program data meanings.

17. The method of claim 13, wherein the step of determining if data from the received data locations of the first program are consistent with corresponding data of the exchange standard is performed by determining if a program data profile exists and an exchange standard data profile exists via the discovery manager.

18. The method of claim 17, wherein the discovery manager including a convolutional neural network.

19. The method of claim 13, further including creating a communication transfer transform including rules for data reading and/or data writing.

20. The method of claim 19, wherein the data transform and the communication transfer transform are assembled by an adapter creator for the exchange standard adapter.

21. The method of claim 13, wherein the step of determining if data from the received data locations of the first program are consistent with corresponding data of the exchange standard includes determining if a first program data is out of a data range described in the exchange standard.

22. The method of claim 21, wherein the first program data includes one or more of intrinsic characteristics: a data value range, a data hierarchical structure, and a data statistical distribution.

23. The method of claim 13, wherein the step of creating a two-way functional data transform if substantial equivalency or substantial consistency is determined includes developing a functional data transform which is a function of both exchange standard data structure/format and program data structure/format.

24. A system for facilitating interoperability between first and second different programs in an automatic or substantially automatic manner, comprising:
 a first bidirectional exchange standard adapter including one or more first hyper objects each having first rules, the first rules defining a first data functional transform and a first communication transfer transform, the first data functional transform being a first conversion function of data structures and data formats between a first program and an exchange standard, the first bidirectional exchange standard adapter further including a first communication transfer transform standard for data reading and data writing for the first program;
 a second bidirectional exchange standard adapter including one or more second hyper objects each having second rules, the second rules defining a second data functional transform and a second communication transfer transform, the second data functional transform being a conversion function of data structures in data formats between a second program and the exchange standard, the second bi-directional exchange adapter including a second communication transfer transform standard for data reading and data writing for the second program; and
 a common communication link coupled between the first bidirectional exchange standard adapter and the second bidirectional exchange standard adapter and conveying exchange standard information bi-directionally therebetween.

25. The system of claim 24, wherein the first program contains information in a first language, and wherein the second program contains information in a second language that is different from the first language.

26. The system of claim 25, wherein the second program responds in the second language to the first adapter.

27. The system of claim 25, wherein the exchange standard information conveyed through the common communication link contains information in a third language that is different from the first language and the second language.

28. A bidirectional exchange standard adapter for enabling a given program to interoperate with a different program having another bidirectional exchange standard adapter, comprising:
 one or more hyper objects including one or more rules defining a two-way functional transform;
 the functional transform being a data conversion function of data structures and data formats for the given program and for an exchange standard;
 the one or more hyper objects defining rules for data reading and data writing for the given program; and
 whereby intercommunication with the another bidirectional exchange standard adapter is facilitated to provide interoperability between the given program and the different program.

29. The bidirectional exchange standard adapter of claim 28, wherein the rules include the functional transform, the data reading and the data writing.

30. The bidirectional exchange standard adapter of claim 28, further including a communication link for communication between the adapter and another bidirectional exchange standard adapter for conveying two-way exchange standard information.

31. The bidirectional exchange standard adapter of claim 28, wherein the bidirectional exchange standard adapter includes a read group of hyper objects configured to receive information from a first bidirectional link which is coupled to the given program.

32. The bidirectional exchange standard adapter of claim 31, wherein the read group of hyper objects conveys information to a first program data group of hyper objects.

33. The bidirectional exchange standard adapter of claim 32, wherein the program data group forms a part of an ES data transform and conveys the transformed data to the bidirectional link and to the another bidirectional exchange standard adapter.

34. The bidirectional exchange standard adapter of claim 33, wherein a second program data group of hyper objects forms a part of the ES data transform and conveys information from the bidirectional link from the another bidirectional exchange standard adapter.

35. The bidirectional exchange standard adapter of claim 34, wherein information from the second program data group of hyper objects is conveyed to a write group of hyper objects.

36. The bidirectional exchange standard adapter of claim 35, wherein the write group of hyper objects and the read group of hyper objects form read/write data configured to convey the information to the first bidirectional link.

37. The bidirectional exchange standard adapter of claim 36, wherein the groups of hyper objects are executed under the control of a server.

* * * * *